(12) United States Patent
Marsetz et al.

(10) Patent No.: US 12,316,164 B2
(45) Date of Patent: May 27, 2025

(54) ELECTRIC MACHINE HAVING SHOULDERS BETWEEN A PLURALITY OF CONDUCTORS AND TABS OF A WINDING RECEPTACLE REGION OF A STATOR OR OF A ROTOR

(71) Applicant: Schaeffler Technologies AG & Co. KG, Herzogenaurach (DE)

(72) Inventors: Michael Marsetz, Ettlingen (DE); Fabian Oehler, Wachenheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/641,205

(22) PCT Filed: Aug. 25, 2020

(86) PCT No.: PCT/DE2020/100743
§ 371 (c)(1),
(2) Date: Mar. 8, 2022

(87) PCT Pub. No.: WO2021/047721
PCT Pub. Date: Mar. 18, 2021

(65) Prior Publication Data
US 2024/0055913 A1    Feb. 15, 2024

(30) Foreign Application Priority Data
Sep. 10, 2019    (DE) .............. 10 2019 124 226.6

(51) Int. Cl.
*H02K 1/16* (2006.01)
*H02K 3/24* (2006.01)

(52) U.S. Cl.
CPC .............. *H02K 1/165* (2013.01); *H02K 3/24* (2013.01)

(58) Field of Classification Search
CPC ........... H02K 1/165; H02K 1/20; H02K 1/16; H02K 1/06; H02K 3/24; H02K 3/2832; H02K 3/3448; H02K 3/487
See application file for complete search history.

(56) References Cited

U.S. PATENT DOCUMENTS

| 4,994,700 A * | 2/1991 | Bansal ...................... H02K 3/48 |
| | | 310/60 A |
| 2008/0084139 A1* | 4/2008 | Schroer .................. H02K 3/522 |
| | | 310/67 R |

(Continued)

FOREIGN PATENT DOCUMENTS

| AT | 93548 B | 7/1923 |
| CN | 203774895 U | 8/2014 |

(Continued)

*Primary Examiner* — Nguyen Tran
(74) *Attorney, Agent, or Firm* — Volpe Koenig

(57) ABSTRACT

An electric machine for driving a motor vehicle, having a stator and a rotor, rotatably mounted relative to the stator. The stator or the rotor is equipped with a winding receptacle region having a plurality of radially extending longitudinal slots distributed in a circumferential direction. Each longitudinal slot has with an opening toward one radial side, the width of which opening is delimited by two ends of two tabs directed toward each other in the circumferential direction, wherein each longitudinal slot has, between a chamber region receiving a plurality of conductors and the two tabs, at least one shoulder reducing a width of the chamber region, the conductors being supported in a radial direction on the at least one shoulder.

10 Claims, 4 Drawing Sheets

(56) References Cited

U.S. PATENT DOCUMENTS

| | | | |
|---|---|---|---|
| 2010/0295390 A1* | 11/2010 | Rau | H02K 1/165 |
| | | | 310/216.069 |
| 2012/0293037 A1* | 11/2012 | Uchida | H02K 3/487 |
| | | | 310/214 |
| 2014/0117805 A1 | 5/2014 | Hagiwara | |
| 2014/0210284 A1 | 7/2014 | Banba | |
| 2018/0254673 A1 | 9/2018 | Koizumi et al. | |
| 2019/0149023 A1* | 5/2019 | Weber | H02K 3/345 |
| | | | 310/216.069 |
| 2020/0052533 A1* | 2/2020 | Fratila | H02K 1/165 |
| 2021/0044160 A1* | 2/2021 | Leiber | H02K 1/148 |

FOREIGN PATENT DOCUMENTS

| | | |
|---|---|---|
| CN | 104079096 A | 10/2014 |
| CN | 104160594 A | 11/2014 |
| CN | 206948051 U | 1/2018 |
| CN | 109088490 A | 12/2018 |
| EP | 1322026 A1 | 6/2003 |
| EP | 2568576 A2 | 3/2013 |

\* cited by examiner

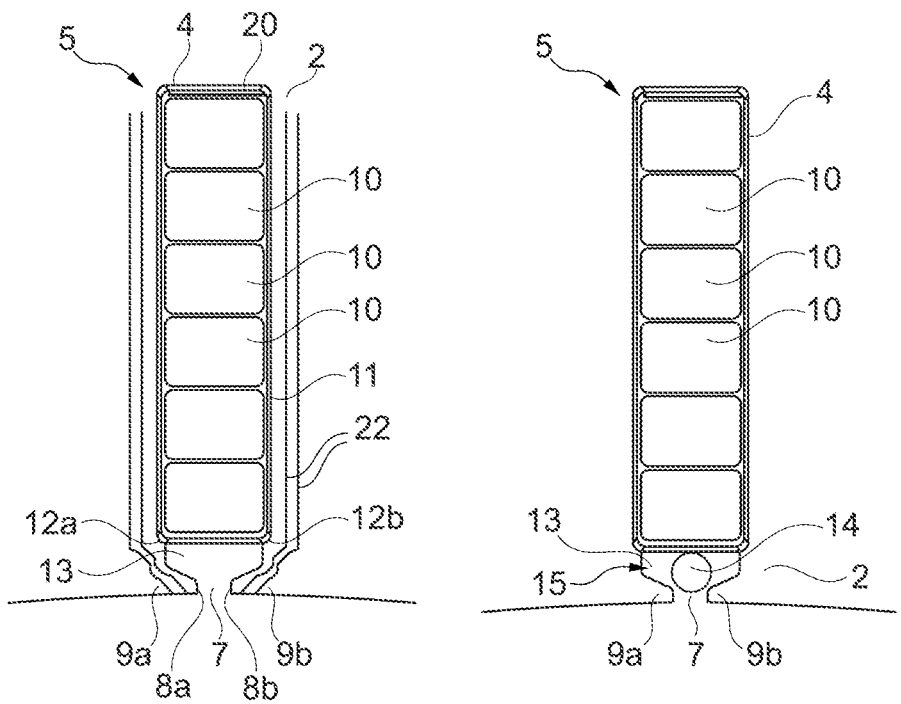
Fig. 3
Fig. 5
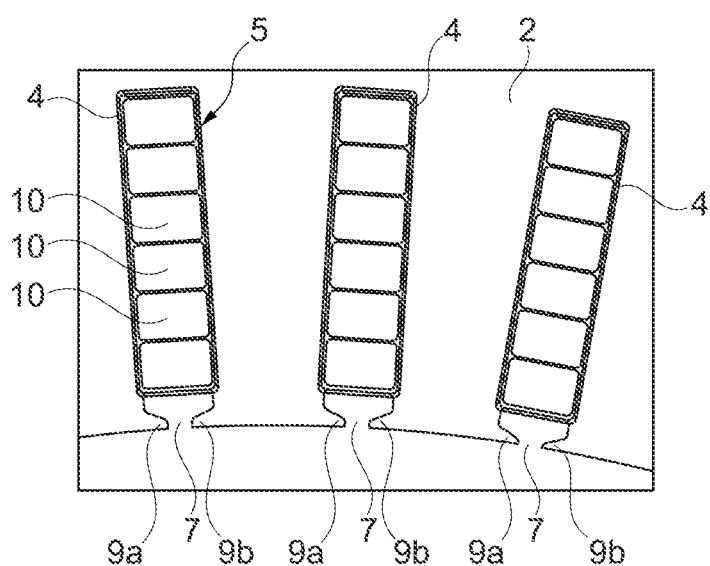
Fig. 4

ELECTRIC MACHINE HAVING SHOULDERS BETWEEN A PLURALITY OF CONDUCTORS AND TABS OF A WINDING RECEPTACLE REGION OF A STATOR OR OF A ROTOR

CROSS-REFERENCE TO RELATED APPLICATIONS

This application is the U.S. National Phase of PCT Appln. No. PCT/DE2020/100743 filed Aug. 25, 2020, which claims priority to DE 10 2019 124 226.6 filed Sep. 10, 2019, the entire disclosures of which are incorporated by reference herein.

TECHNICAL FIELD

The disclosure relates to an electric machine for driving a (hybrid or purely electrically driven) motor vehicle, such as a car, truck, bus or other commercial vehicle, having a stator and a rotor, rotatably mounted relative to the stator, wherein the stator or the rotor is equipped with a winding receptacle region having a plurality of radially extending longitudinal slots distributed in a circumferential direction, and wherein each longitudinal slot has an opening toward one radial side, the width of which opening is delimited by two ends of two tabs directed toward each other in the circumferential direction.

BACKGROUND

An electric machine of this type known from the prior art can be seen in FIG. 8 in the region of its stator 2'. In this case, a plurality of conductors 10' are received within a longitudinal slot 4' of the stator 2'. In this known embodiment, the region of the longitudinal slot 4' receiving the conductor 10' is delimited by a wedge K. The wedge K is inserted into a receptacle contour, as a result of which tabs that remain inside the wedge K are formed, which delimit an opening to the environment.

However, in this embodiment known from the prior art, there is the disadvantage that the wedges to be provided separately make the construction of the stator relatively complex. In addition, the wedges are to be manufactured separately and the stator is to be provided with appropriate receptacles for these wedges. As a result, there is a relatively high installation effort. Furthermore, there is the disadvantage that the magnetic field lines generated during operation, as identified by reference number 22' in FIG. 8, are deflected relatively strongly by the existing receptacle contour and the wedges, which in turn has a negative influence.

SUMMARY

Therefore, the object of the present disclosure is to eliminate the disadvantages known from the prior art and, in particular, to provide an electric machine, which has both the simplest possible design and the highest possible efficiency.

According to the disclosure, this is achieved in that each longitudinal slot is provided radially between a chamber region receiving a plurality of conductors and the two tabs with at least one shoulder that reduces the width (dimension in the circumferential direction) of the chamber region, wherein the conductors are supported in a radial direction on the at least one shoulder.

By providing the at least one shoulder, a radial region is created within the conductors, through which the magnetic field lines are deflected to the tabs in a much less abrupt manner. This increases the efficiency of the electric machine. In addition, the conductors are supported directly by this shoulder, eliminating the need for additional elements such as support wedges.

Further advantageous embodiments are claimed and explained in more detail below.

If the at least one shoulder is spaced radially from the two tabs, a radial region is made available within which the magnetic flux lines are redirected even more gently. In this context, it is therefore also advantageous if a width of the longitudinal slot remains the same or is further reduced radially from the at least one shoulder in the direction of the tabs.

An even more effective use of space is achieved if a sensor, preferably in the form of a temperature sensor, is arranged in a cavity formed between the at least one shoulder and the tabs.

In this regard, it is also advantageous as an alternative or in addition to the attachment of the sensor if the cavity formed between the at least one shoulder and the tabs is part of a coolant duct and consequently also forms the coolant duct. This cools the electric machine directly and makes it even more powerful.

If each tab has a conical side flank facing the conductors, the magnetic field lines are deflected even more gently.

In this context, it is also expedient if each side flank is inclined in such a way that it runs away from the conductors in the direction of the end.

If the chamber region is implemented as a region with a constant width, the contour of the longitudinal slot can be produced as simply as possible.

The winding receptacle region is advantageously formed by a plurality of individual metal sheets arranged as a stack.

It is furthermore advantageous if the at least one shoulder, and preferably also the entire longitudinal slot (including the tabs), is produced by means of stamping.

If two shoulders arranged at the same radial height are provided, the deflection of the field lines is implemented even more effectively.

In other words, according to the disclosure, an electric machine with a slot shoulder in front of the tooth head is implemented in a stator or a rotor. According to the disclosure, a chamfered or slotted shoulder is provided to accurately place appropriate conductors (and insulating paper) in a slot. This also influences the magnetic field lines. The geometry of the slot shoulder can be easily adjusted corresponding to the winding or the insulating paper. The slot shoulder prevents the windings from falling or slipping out of the slot in the radial direction.

BRIEF DESCRIPTION OF THE DRAWINGS

The disclosure will now be explained in more detail with reference to figures, in which context various exemplary embodiments are also shown.

In the figures:

FIG. 3 shows a detailed view of the stator, similar to FIG. 2, wherein now a plurality of magnetic flux lines built up in operation are represented schematically, FIG. 4 shows a detailed view of the stator in the region of three adjacent longitudinal slots, FIG. 5 shows a detailed view of a longitudinal slot of an electric machine according to the disclosure according to a second exemplary embodiment, in which, in comparison to the first exemplary embodiment, a temperature sensor is inserted in a cavity of the longitudinal slot between a plurality of conductors and two tabs of the winding receptacle region.

The figures are only schematic in nature and serve only for understanding the disclosure. The same elements are provided with the same reference signs. The different features of the various exemplary embodiments can in principle also be freely combined with one another.

DETAILED DESCRIPTION

Figure 1:
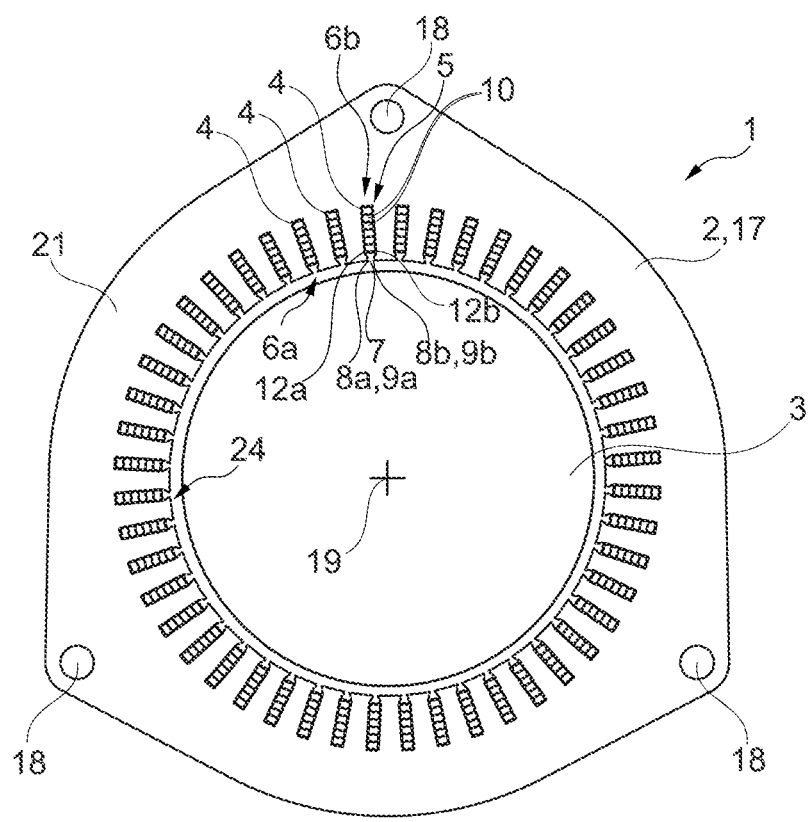
FIG. 1 shows a schematic cross-sectional view of an electric machine according to the disclosure according to a first exemplary embodiment with a stator shown in detail, wherein the sectional plane is selected such that a plurality of longitudinal slots which form a winding receptacle region and are distributed in the circumferential direction can be clearly seen.

FIG. 1 shows a basic structure of an electric machine 1 according to the disclosure based on a first exemplary embodiment. The electric machine 1 is used as a drive machine in a drive train of a hybrid or purely electric motor vehicle.

The electric machine 1 usually has a stator 2 fixed to the housing and a rotor 3 mounted so that it can rotate relative to this stator 2. In this embodiment, the electric machine 1 is implemented as an internal rotor and the rotor 3 is consequently received radially inside the ring-shaped stator 2.

Furthermore, it can be seen in principle that a winding receiving region 5 designed according to the disclosure and described in more detail below is implemented in the stator 2. The rotor 3 is consequently equipped with a plurality of magnets that interact with the winding receptacle region 5 during operation. In further embodiments according to the disclosure, however, the reverse arrangement is chosen, so that the rotor 3 is equipped directly with the winding receptacle region 5.

For the sake of completeness, it should be pointed out that the directional information used here relates axially, radially and in the circumferential direction/tangentially to an axis of rotation 19 of the rotor 3. Consequently, an axial direction is a direction along the rotational axis 19, a radial direction is a direction perpendicular to the rotational axis 19 and a circumferential direction is a circular line that runs coaxially about the rotational axis 19.

The stator 2 has a plurality of individual metal sheets 17 which are stacked in the axial direction and are implemented as identical parts. One of these individual metal sheets 17 can be seen in FIG. 1. Each individual metal sheet 17 and consequently also the entire stack/laminate pack of individual metal sheets 17 is provided with a plurality of longitudinal slots 4 running in the axial direction and opening inwards in the radial direction. These longitudinal slots 4 together form the winding receiving region 5. The longitudinal slots 4 are all implemented in the same way and are arranged evenly distributed in the circumferential direction. A plurality of rod-shaped conductors 10 (six conductors 10 here) are arranged within the respective longitudinal slot 4 and are used to form a corresponding coil winding/coil.

Figure 2:
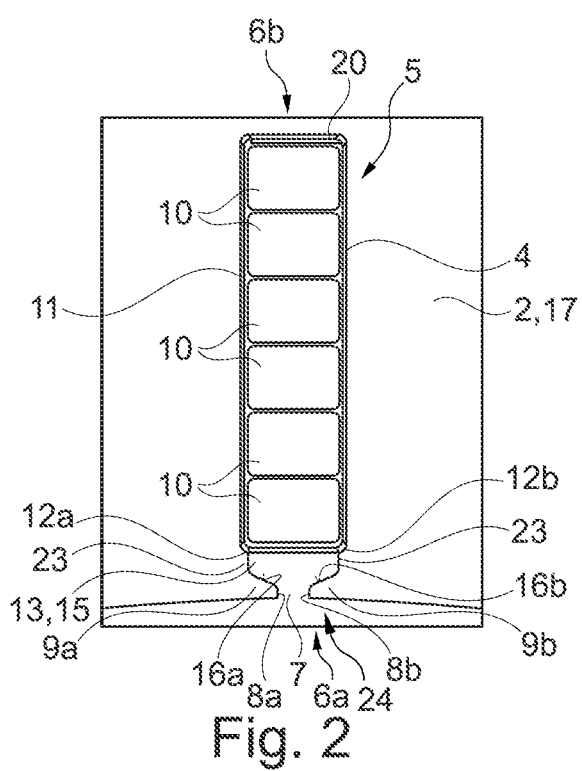
FIG. 2 shows a detailed view of the stator used in FIG. 1 in the region of a longitudinal slot.

In FIGS. 2 and 4, the closer contour of one of the longitudinal slots 4 can be seen. Accordingly, the longitudinal slot 4 shown as a representative of all other longitudinal slots 4 has a chamber region 11 running (exclusively) in the radial direction and having a constant width/dimension in the circumferential direction. The chamber region 11 has a rectangular shape in the cross-sectional view of FIGS. 2 and 4.

The conductors 10 are received in the chamber region 11, forming a conductor pack/winding pack. The conductors 10 are wrapped with an insulating paper 20 as a whole. The conductor pack, i.e., the conductors 10 with the insulating paper 20 are jointly secured in position in the chamber region 11 in the radial direction. As explained in more detail below, two shoulders 12a, 12b projecting in the circumferential direction serve to radially secure the conductor 10, of which only one shoulder 12a or 12b is provided in further embodiments according to the disclosure.

FIG. 2 also shows that radially inside the conductor 10/chamber region 11, two tabs 9a, 9b pointing towards one another in the circumferential direction are implemented in one piece with the respective individual metal sheet 17/section of the stator 2 forming the chamber region 11. A first tab 9a consequently has a (first) free end 8a which is opposite/facing a (second) free end 8b of the second tab 9b in the circumferential direction. The two tabs 9a, 9b are essentially the same size.

The two ends 8a, 8b of the tabs 9a, 9b are spaced apart in the circumferential direction, so that a radial opening 7 is formed between them. In this embodiment, the radial opening 7 is arranged on a first radial side 6a in the form of a radial inside of the conductor 10. As can be seen in FIG. 1, a continuous circumferential annular region 21 of the respective individual metal sheet 17 extends to a second radial side 6b (radial outer side) of the conductors 10 facing away from the first radial side 6a. The tabs 9a, 9b consequently form a tooth head 24 of the stator 2 together.

Like the tabs 9a, 9b, the two shoulders 12a, 12b are arranged on opposite circumferential sides. While a first shoulder 12a is located on the same circumferential side as the first tab 9a, a second shoulder 12b is located on the same circumferential side as the second tab 9b. The two shoulders 12a, 12b are the same size. The shoulders 12a, 12b are arranged radially outside the tabs 9a, 9b. In addition, the shoulders 12a, 12b are spaced apart from the tabs 9a, 9b in a radial direction, so that a corresponding cavity 13 is formed between the inside of the conductor 10 and the tabs 9a, 9b.

According to this configuration of the shoulders 12a, 12b, which at the same time serve as a radial stop/fuse for the conductor 10, the step-like transition of the magnetic field lines that can be seen in FIG. 3 results during operation. The shoulders 12a, 12b are formed in such a way that they reduce the width of the chamber region 11/are offset from the circumferential side edges of the chamber region 11 in the circumferential direction.

Towards the radial inside of the shoulders 12a, 12b, the longitudinal slot 4 in turn extends over a transition region 23 to the tabs 9a, 9b. In this case, the transition region 23 has a constant width (dimensions in the circumferential direction) and also delimits the cavity 13. The tabs 9a, 9b in turn extend away to a radial inner side of the transition region 23.

Furthermore, in the first exemplary embodiment, the tabs 9a, 9b are provided with side flanks 16a, 16b, which run conically in the circumferential direction, on a radial side facing the conductors 10. A first side flank 16a (of the first tab 9a) thus increases its distance from the conductors 10 towards the free end 8a along its course. A second side flank 16b (of the second tab 9b) increases its distance from the conductors 10 towards the free end 8b along its course.

In further embodiments according to the disclosure, as can be seen in connection with the second exemplary embodiment according to FIG. 5, a further component can in principle be attached in the cavity 13. In this embodiment, a sensor 14 in the form of a temperature sensor is integrated in the cavity 13.

Furthermore, this cavity 13 is designed as part of a coolant duct 15 of a cooling device. Thus, during operation, a coolant flows axially through this cavity 13/the stator 2. In further embodiments, the opening 7 between the two tabs 9a, 9b is also closed by a cover.

Figure 6:
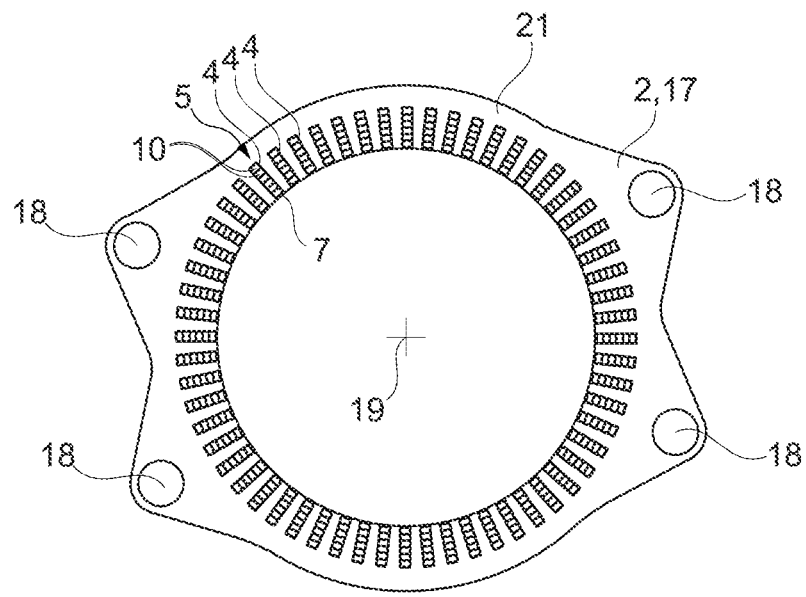
FIG. 6 shows a front view of a stator of an electric machine according to the disclosure implemented according to a third exemplary embodiment, wherein the stator now has four fastening means receptacle holes.
Figure 7:
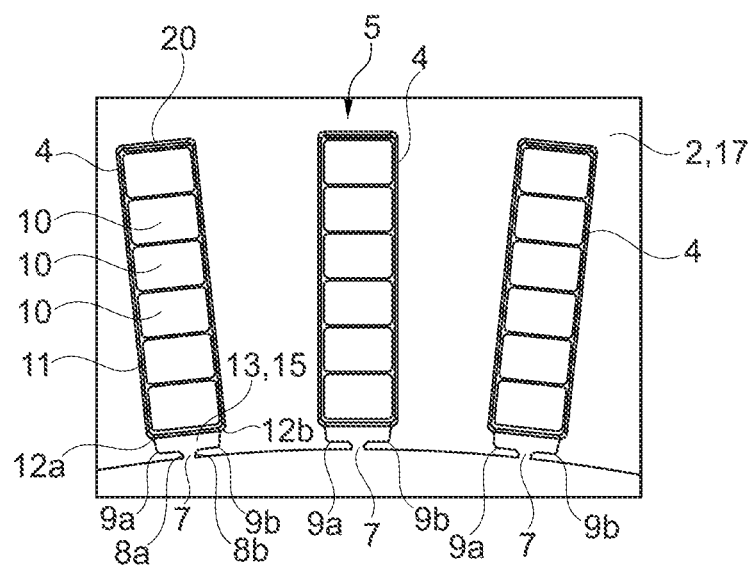
FIG. 7 shows a detailed view of the stator according to FIG. 6 in the region of three longitudinal slots.
Figure 8:
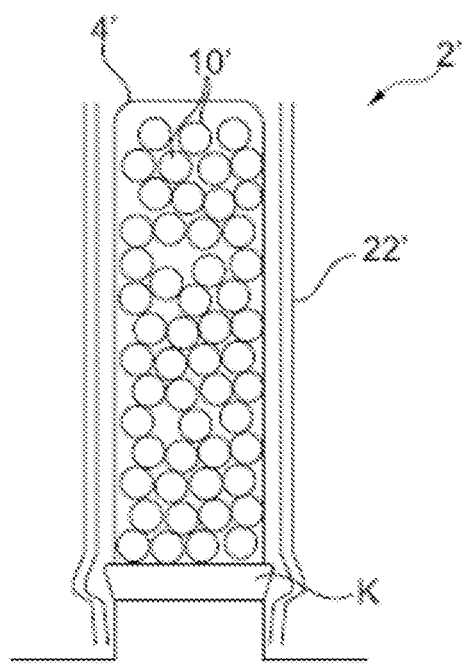
FIG. 8 shows a detailed view of a prior art stator in the region of a longitudinal slot.

Furthermore, according to the third embodiment of FIGS. 6 and 7, it is also advantageous if the tabs 9a, 9b have a non-conical extension and are consequently provided with straight side flanks 16a, 16b running parallel to the insides of the conductors 10/exclusively axially.

In other words, a slot geometry (geometry of the longitudinal slot 4) is implemented according to the disclosure, through which both the winding 10 can be placed in the slot 4 in a more defined manner and the electromagnetic lines can be guided in a more targeted manner, thereby reducing the iron losses. In this case, additional components such as slot sealing wedges should be dispensed with. This keeps the number of components, the process steps and therefore the costs low. In addition, space can be created in the stator 2 (or rotor 3) by the solution, if necessary, in order to be able to place necessary components, such as sensors or tools, at optimal locations.

FIGS. 1 and 2 show a stator 2 in which the inventive solution can be seen. This is a taper (due to shoulders 12a, 12b) in front of the tooth head 24. This slot shoulder 12a, 12b replaces, among other things, the slot sealing wedges previously used and is used in a targeted manner in order to position the conductor 10 and the insulating paper 20 precisely in the slot 4. This also influences the magnetic flux lines. Since only a small shoulder 12a, 12b is necessary here, the geometry can easily be adjusted corresponding to the winding 10 or the insulating paper 20.

The slot shoulder 12a, 12b prevents the winding 10 from falling out or being displaced in the radial direction. The shoulder 12a, 12b is already introduced in the metal sheet cutting, i.e., when the stator metal sheet 17 is stamped, and does not require any additional process steps. In contrast to the known slot sealing wedges, in which counterproductive deflections of the field lines occur due to the notches or similar for fixing in the slot, the design of the slot shoulders 12a, 12b according to the disclosure results in a more even or only slightly deflected course of those field lines 22 generated (FIG. 3).

Due to the principle of the slot shoulder 12a, 12b, the slot 4 up to the shoulder 12a, 12b can be used from already tested stators 2 for further stators 2, so that only the region of the tooth head 24 has to be changed for optimization. FIGS. 6 and 7 show this advantage. Thus, two different stators 2 of different electric machines 1 are shown. Their geometric dimensions and thus also their performance classes are different. However, the geometry of the slot 4 in the region of the winding 10 and the insulating paper 20 of one stator 2 can be transferred to the other. Optimizations with regard to the design take place here in the tooth head 24. However, the slot geometry in the region of the conductor 10, conductor material and insulating paper 20 are identical in both stators 2 of FIGS. 1 and 6.

Another advantage is the possibility of using the region (cavity 13) between the conductor material and the air gap for additional components. Here, for example, there is the possibility of installing a temperature sensor 14 in order to be able to determine the temperature of the winding 10, the laminate pack or the medium located therein (FIG. 5). Alternatively or additionally, it is possible to use the installation space running over the entire active length for active cooling. Cooling channels 15 can be drawn here, through which cooling media flow and can be applied directly to the winding 10. The space created between the conductor material and the air gap can also be used for tools (e.g., insertion tools) which would not fit through the gap 7 in the tooth head 24.

The following advantages can thus be summarized by the slot shoulder 12a, 12b implemented as a taper in front of the tooth head 24: —control of the placement of the winding in the slot 4 without additional components; —targeted control of the electromagnetic flow; —use of identical geometries of the slot 4 in the winding 10 for different stators 2 rotors 3 (resulting in a shorter development time); —use of identical wires 10 and insulating paper 20 for different stators 2/rotors 3 (which leads to financial savings, fewer parts, and a shorter development time); —use of space 13 between conductor material and air gap for tools or components (e.g., sensors 14).

LIST OF REFERENCE SYMBOLS

1 Electric machine
2 Stator
3 Rotor
4 Longitudinal slot
5 Winding receptacle region
6a First side
6b Second side
7 Opening
8a End of the first tab
8b End of the second tab
9a First tab
9b Second tab
10 Conductor
11 Chamber region
12a First shoulder
12b Second shoulder
13 Cavity
14 Sensor
15 Coolant duct
16a Side flank of the first tab
16b Side flank of the second tab
17 Individual metal sheet
18 Fastening means receptacle hole
19 Axis of rotation
20 Insulating paper
21 Annular region

The invention claimed is:

1. An electric machine for driving a motor vehicle, comprising: a stator and a rotor, rotatably mounted relative to the stator, wherein the stator or the rotor is equipped with a winding receptacle region having a plurality of radially extending longitudinal slots distributed in a circumferential direction, and wherein each longitudinal slot has with an opening toward one radial side, a width of which opening is delimited by two ends of two tabs directed toward each other in the circumferential direction, wherein each longitudinal slot has a chamber region receiving a plurality of conductors and at least one shoulder reducing a width of the chamber region, wherein the conductors are supported in a radial direction on the at least one shoulder such that the conductors are restricted from movement in the radial direction;

wherein the winding receptacle region is formed by a plurality of individual metal sheets arranged as a stacked pack; and wherein the at least one shoulder is defined by the plurality of individual metal sheets.

2. The electric machine according to claim 1, wherein the plurality of metal sheets are stamped sheets, and wherein the at least one shoulder is integral with the plurality of metal sheets.

3. The electric machine according to claim 1, wherein a sensor is arranged in a cavity formed between the at least one shoulder and the tabs.

4. The electric machine according to claim 3, wherein the cavity formed between the at least one shoulder and the tabs is part of a coolant duct.

5. The electric machine according to claim 1, wherein each of the two tabs has a conically running side flank facing the conductors.

6. The electric machine according to claim 5, wherein each side flank is inclined in such a way that it runs away from the conductors in a direction of the end.

7. The electric machine according to claim 1, wherein the chamber region is implemented as a region with a constant width.

8. The electric machine according to claim 1, wherein the at least one shoulder is produced by stamping.

9. The electric machine according to claim 1, wherein a total of two shoulders arranged at a common radius are provided.

10. The electric machine according to claim 1, wherein the at least one shoulder is spaced radially apart from the two tabs, and is integral with the stator or rotor.

* * * * *